(12) United States Patent
Manteiga et al.

(10) Patent No.: US 10,113,483 B2
(45) Date of Patent: Oct. 30, 2018

(54) SUMP HOUSING FOR A GAS TURBINE ENGINE

(71) Applicant: General Electric Company, Schenectady, NY (US)

(72) Inventors: John Alan Manteiga, North Andover, MA (US); Jordan Tesorero, Lynn, MA (US); Emilio Eramo, Lynn, MA (US); Michael D. Miller, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 269 days.

(21) Appl. No.: 15/051,284

(22) Filed: Feb. 23, 2016

(65) Prior Publication Data

US 2017/0241343 A1    Aug. 24, 2017

(51) Int. Cl.
*F02C 7/06* (2006.01)
*F01D 25/18* (2006.01)
*F02C 3/04* (2006.01)
*F01D 25/12* (2006.01)
*F01D 9/06* (2006.01)

(52) U.S. Cl.
CPC ............ *F02C 7/06* (2013.01); *F01D 25/125* (2013.01); *F01D 25/18* (2013.01); *F01D 25/183* (2013.01); *F01D 25/186* (2013.01); *F02C 3/04* (2013.01); *F01D 9/065* (2013.01); *F05D 2220/32* (2013.01); *F05D 2230/53* (2013.01); *F05D 2240/35* (2013.01); *F05D 2240/50* (2013.01); *F05D 2240/60* (2013.01);

(Continued)

(58) Field of Classification Search
CPC .......... F02C 7/06; F01D 25/125; F01D 25/18; F01D 25/183; F01D 25/186; F01D 9/06; F01D 9/065; F05D 2260/602; F05D 2260/608; F05D 2260/98

See application file for complete search history.

(56) References Cited

U.S. PATENT DOCUMENTS 4,046,223 A *  9/1977  McHugh ............... F01D 25/125
                                                         184/104.3
4,264,272 A    4/1981  Weiler
                       (Continued)

FOREIGN PATENT DOCUMENTS

EP    1 247 944 A2    10/2002
EP    3 040 583 A1    7/2016
(Continued)

OTHER PUBLICATIONS

Extended European Search Report and Opinion issued in connection with corresponding EP Application No. 17157082.3 dated Aug. 7, 2017.

(Continued)

*Primary Examiner* — Steven Sutherland
(74) *Attorney, Agent, or Firm* — General Electric Company; Brian Overbeck

(57) ABSTRACT

A sump housing apparatus for a gas turbine engine includes: an annular body; and a plurality of service tubes arrayed around the body, each service tube having a proximal end intersecting the body and an opposed distal end, each service tube having an inner port communicating with an interior of the body; wherein the body and at least one of the service tubes are part of a monolithic whole.

20 Claims, 12 Drawing Sheets

(52) U.S. Cl.
CPC .. *F05D 2260/602* (2013.01); *F05D 2260/608* (2013.01); *F05D 2260/98* (2013.01)

(56) References Cited

U.S. PATENT DOCUMENTS

| | | | | |
|---|---|---|---|---|
| 5,201,845 | A | * | 4/1993 | Allmon ............... F01D 25/18 |
| | | | | 184/6.23 |
| 5,272,869 | A | * | 12/1993 | Dawson ............... F01D 9/042 |
| | | | | 415/142 |
| 5,292,227 | A | * | 3/1994 | Czachor ............. F01D 25/162 |
| | | | | 415/142 |
| 6,679,045 | B2 | * | 1/2004 | Karafillis ............. F01D 25/16 |
| | | | | 184/6.11 |
| 6,893,208 | B2 | * | 5/2005 | Frosini ................ F01D 25/16 |
| | | | | 184/6 |
| 7,093,418 | B2 | | 8/2006 | Morris et al. |
| 7,344,354 | B2 | | 3/2008 | Lammas et al. |
| 8,915,057 | B2 | | 12/2014 | Corattiyil et al. |
| 2003/0110778 | A1 | | 6/2003 | Karafillis et al. |
| 2010/0136323 | A1 | | 6/2010 | Varanasi et al. |
| 2014/0022150 | A1 | | 1/2014 | Guo et al. |
| 2014/0174858 | A1 | | 6/2014 | Remer et al. |
| 2015/0052872 | A1 | | 2/2015 | Zurmehly et al. |
| 2015/0139784 | A1 | | 5/2015 | Grelin et al. |
| 2015/0224743 | A1 | | 8/2015 | Schick et al. |
| 2017/0107854 | A1 | | 4/2017 | Friedl |

FOREIGN PATENT DOCUMENTS

| | | |
|---|---|---|
| WO | 2014/022150 A1 | 2/2014 |
| WO | 2014093286 | 6/2014 |

OTHER PUBLICATIONS

Unofficial English Translation of Chinese Office Action issued in connection with corresponding CN Application No. 201710099545.6 dated Jun. 1, 2018.

\* cited by examiner

SUMP HOUSING FOR A GAS TURBINE ENGINE

BACKGROUND OF THE INVENTION

The present invention relates to gas turbine engines, more particularly, to sump apparatus for such engines.

A gas turbine engine includes one or more shafts which are mounted for rotation in several bearings, usually of the rolling-element type. The bearings are enclosed in enclosures called "sumps" which are pressurized and provided with an oil flow for lubrication and cooling.

The sump must provide multiple functions, including physical mounting of the bearing races, location of oil and air seals, supply of lubricating oil to the bearings, scavenging spent oil, pressurization of the sump, and ventilation.

One problem with prior art sump housings is that they are built up from individual components such as housings and separate tubes for the different functions. This requires high piece part count (or reduction in features) with multiple joining methods resulting in high cost and weight as well as durability and packaging challenges.

BRIEF DESCRIPTION OF THE INVENTION

This problem is addressed by a sump housing integrating multiple functions into a one-piece structure.

According to one aspect of the technology described herein, sump housing apparatus for a gas turbine engine includes: an annular body; and a plurality of service tubes arrayed around the body, each service tube having a proximal end intersecting the body and an opposed distal end, each service tube having an inner port communicating with an interior of the body; wherein the body and at least one of the service tubes are part of a monolithic whole.

According to another aspect of the technology described herein, a turbine engine apparatus includes: a compressor, a combustor, and a turbine disposed in serial flow relationship; a shaft interconnecting the rotor and the turbine; a sump located axially between the compressor and the turbine, and radially between the combustor and the shaft; and a sump housing defining in part an outer boundary of the sump, and comprising: an annular body; and a plurality of service tubes arrayed around the body, each service tube having a proximal end intersecting the body and an opposed distal end, each service tube having an inner port communicating with the sump; wherein the body and at least one of the service tubes are part of a monolithic whole.

BRIEF DESCRIPTION OF THE DRAWINGS

The invention may be best understood by reference to the following description, taken in conjunction with the accompanying drawing figures in which.

DETAILED DESCRIPTION OF THE INVENTION

Figure 1:
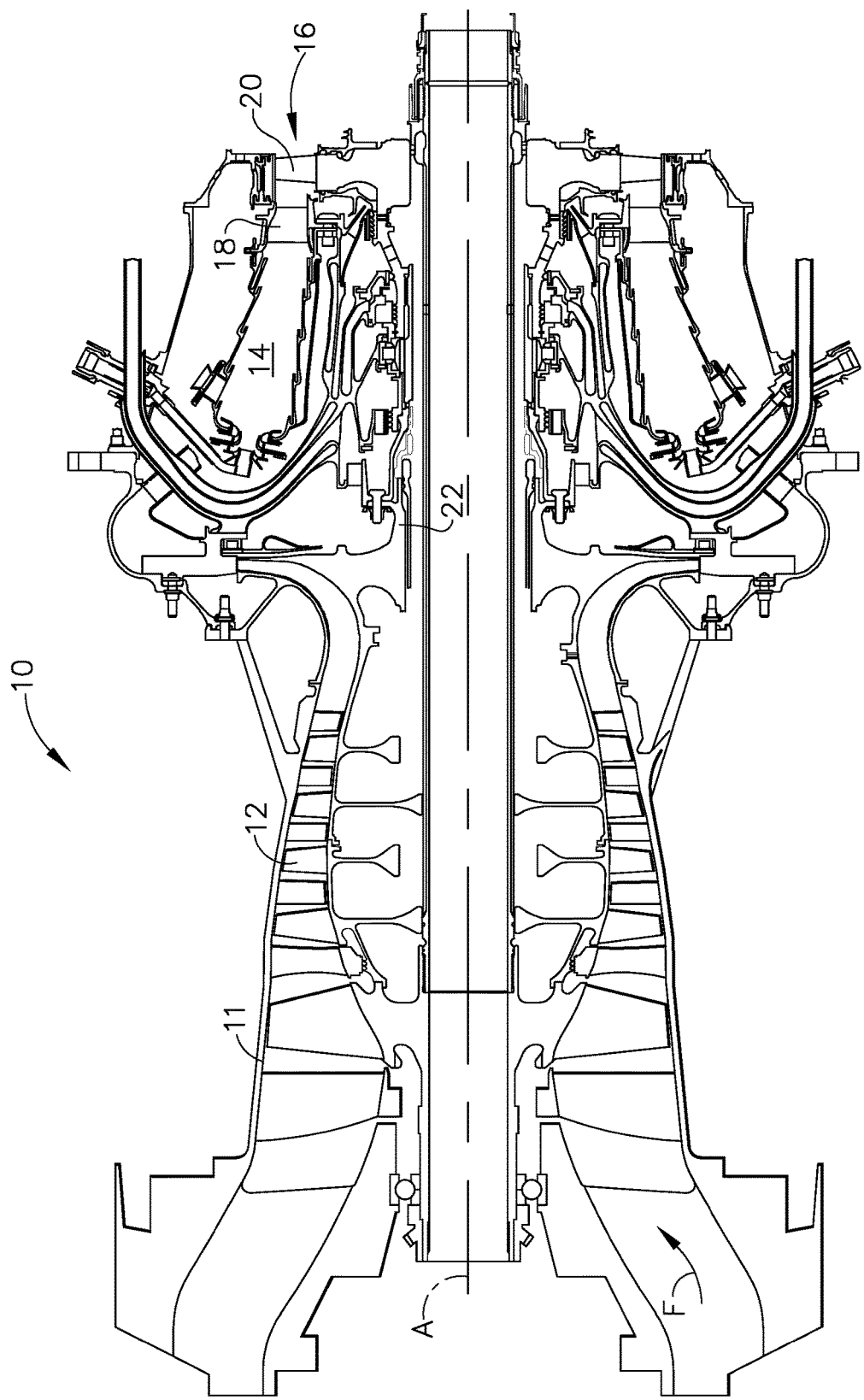
FIG. 1 is a schematic half-sectional view of an exemplary gas turbine engine.

Referring to the drawings wherein identical reference numerals denote the same elements throughout the various views, FIG. 1 depicts an exemplary gas turbine engine 10. the illustrated example is a turboshaft engine. However, the principles described herein are equally applicable to turboprop, turbojet, and turbofan engines, as well as turbine engines used for other vehicles or in stationary applications. The engine 10 has a longitudinal center line or axis A and an outer stationary annular casing 11 disposed concentrically about and coaxially along the axis A.

As used herein, the terms "axial" and "longitudinal" both refer to a direction parallel to the axis A, while "radial" refers to a direction perpendicular to the axial direction, and "tangential" or "circumferential" refers to a direction mutually perpendicular to the axial and tangential directions. As used herein, the terms "forward" or "front" refer to a location relatively upstream in an air flow passing through or around a component, and the terms "aft" or "rear" refer to a location relatively downstream in an air flow passing through or around a component. The direction of this flow is shown by the arrow "F" in FIG. 1. These directional terms are used merely for convenience in description and do not require a particular orientation of the structures described thereby.

The engine 10 has a compressor 12, combustor 14, and a gas generator turbine 16 arranged in serial flow relationship. In operation, compressor 12 provides compressed air that passes into the combustor 14 where fuel is introduced and burned to generate hot combustion gases. The combustion gases are discharged to the gas generator turbine 16 which comprises a row of stationary vanes or nozzles 18 followed by a row of rotating blades or buckets 20. The combustion gases are expanded therein and energy is extracted to drive the compressor 12 through a shaft 22.

The components described above constitute a working gas turbine engine core which may be combined with other elements or modules for a specific application. For example in a turboshaft application a work turbine (not shown) would be disposed downstream of the gas generator turbine 16. The work turbine would be used to further expand the combustion gases and extracts energy to drive an external load (such as a propeller or gearbox).

Figure 2:
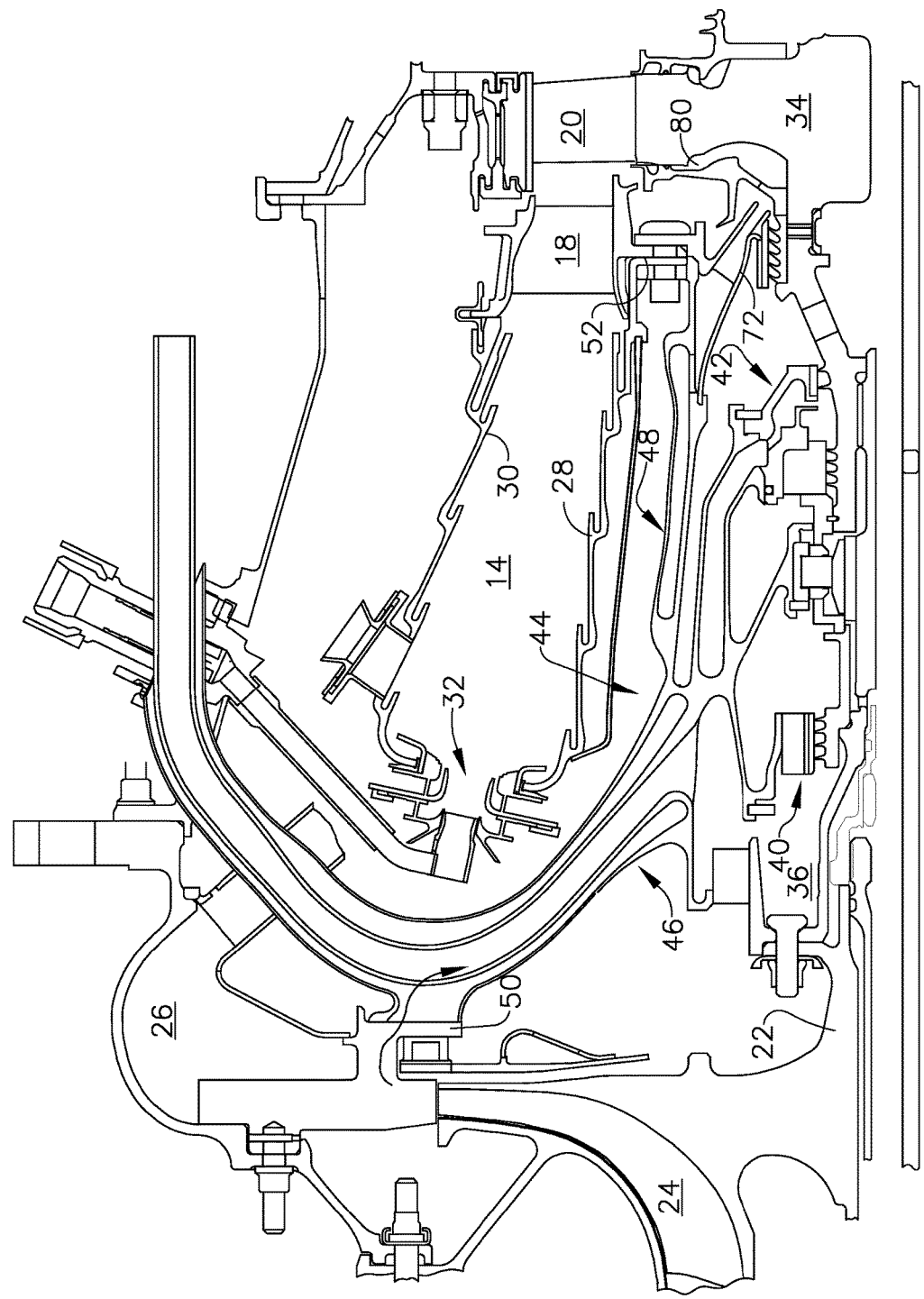
FIG. 2 is a schematic half-sectional view of a portion of the gas turbine engine of FIG. 1.
Figure 3:
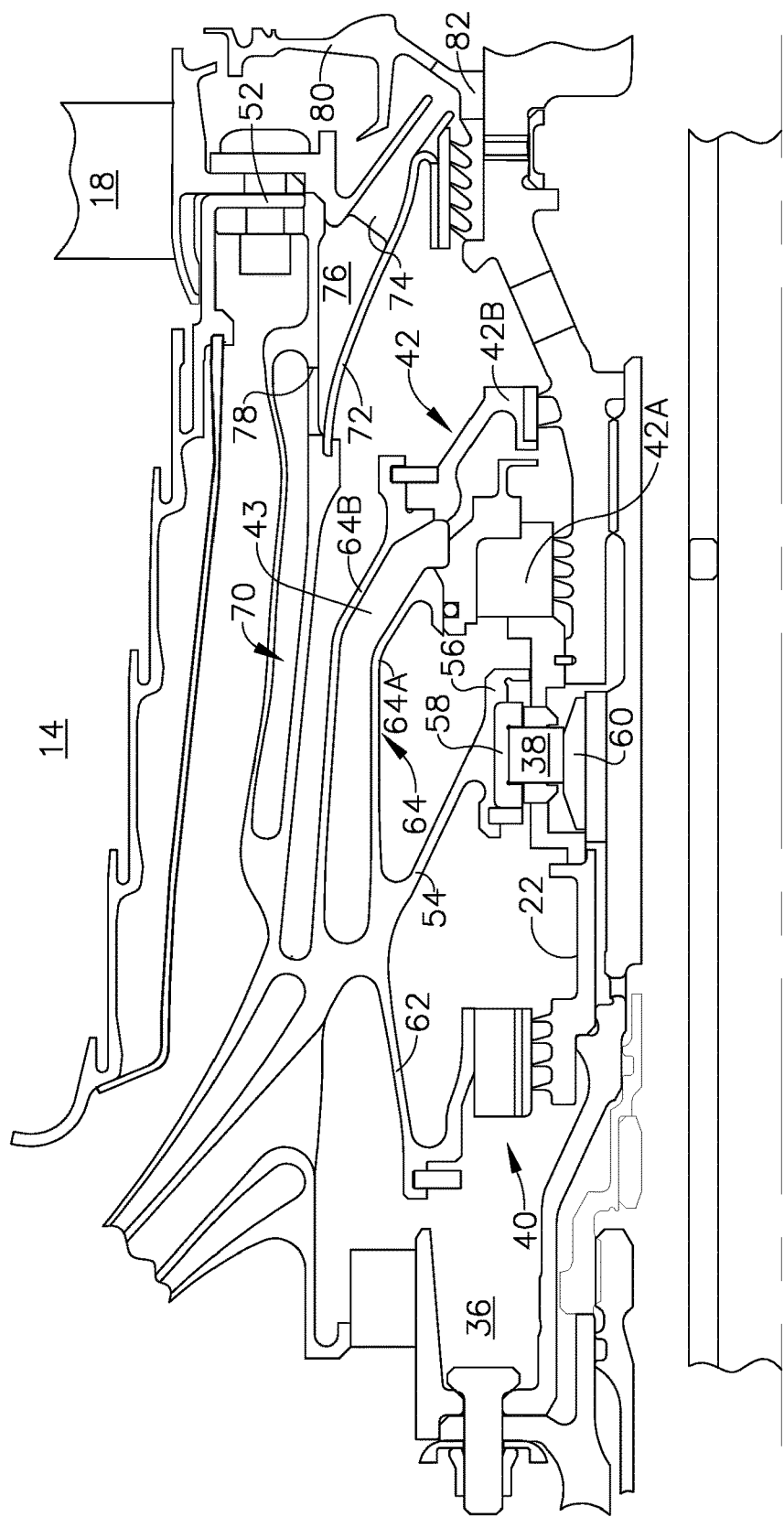
FIG. 3 is an enlarged view of a sump shown in FIG. 2.

FIGS. 2 and 3 illustrate a core section of the engine 10 in more detail. The compressor 12 is configured for mixed axial-centrifugal fluid flow. It includes an impeller 24 mounted for rotation with the shaft 22. A diffuser 26 collects the air discharged from the impeller 24 and redirects it towards the combustor 14.

The combustor 14 includes inner and outer annular liners 28 and 30, respectively. The liners 28, 30 are joined at their upstream ends by a dome assembly 32, and their downstream ends by the turbine nozzles 18.

An annular turbine disk 34 is disposed downstream of the combustor 14. The turbine disk 34 carries the rotating turbine blades 20.

The annular volume located axially between the compressor 12 and the turbine disk 34, and radially between the combustor 14 and the shaft 22 is referred to as a "sump" 36. The shaft 22 passes through the sump 36 and interconnects the compressor 12 and the turbine disk 34. Within the sump 36, the shaft 22 is mounted in a rolling-element bearing 38. The bearing 38 is bounded by forward and aft seal assemblies 40, 42.

A sump housing 44 is disposed between the combustor 14 and the outer shaft 22. The sump housing 44 performs numerous functions, among those functions it defines the outer boundaries of the sump 36 and provides physical mounting for the bearing 38 and the forward and aft seal assemblies 40, 42. The aft seal assembly 42 includes seals 42A, 42B.

As seen in FIGS. 2-5 the sump housing 44 includes an annular body 45 (see FIG. 7) comprising a generally frustoconical forward section 46 and a generally cylindrical aft section 48. A forward mounting flange 50 is disposed at the forward end of the forward section 46 and is secured to the diffuser 26 for example using mechanical fasteners. An aft mounting flange 52 is disposed at the aft end of the aft section 48 and is secured to the turbine nozzle 18 for example using mechanical fasteners.

The sump housing 44 includes numerous tubes, internal passages, and structural elements, which will be described in detail below.

An annular bearing support arm 54 extends radially inward from the body and defines a bearing mount ring 56 at its inboard end. The bearing mount ring 56 receives an outer race 58 of the bearing 38. An inner race 60 of the bearing 38 is mounted to the shaft 22.

An annular forward seal support arm 62 extends axially forward and radially inward from the bearing support arm 54. The forward seal support arm 62 carries a stationary portion of the forward seal assembly 40. A rotating portion of the forward seal assembly 40 is mounted to the shaft 22. In the illustrated example, the forward seal assembly 40 is a noncontact seal such as a labyrinth seal.

An annular aft seal support arm 64 assembly with two spaced-apart arms 64A and 64B extending axially aft and radially inward from the bearing support arm 54. The arm 64A carries a stationary portion of the seal 42A. A rotating portion of the seal 42A is mounted to the shaft 22. The arm 64B carries a stationary portion of the seal 42B. A rotating portion of the seal 42B is mounted to the shaft 22. An air flow path 43 is defined between the arms 64A and 64B. In the illustrated example, the seals 42A and 42B are both noncontact seals such as labyrinth seals.

Figure 4:
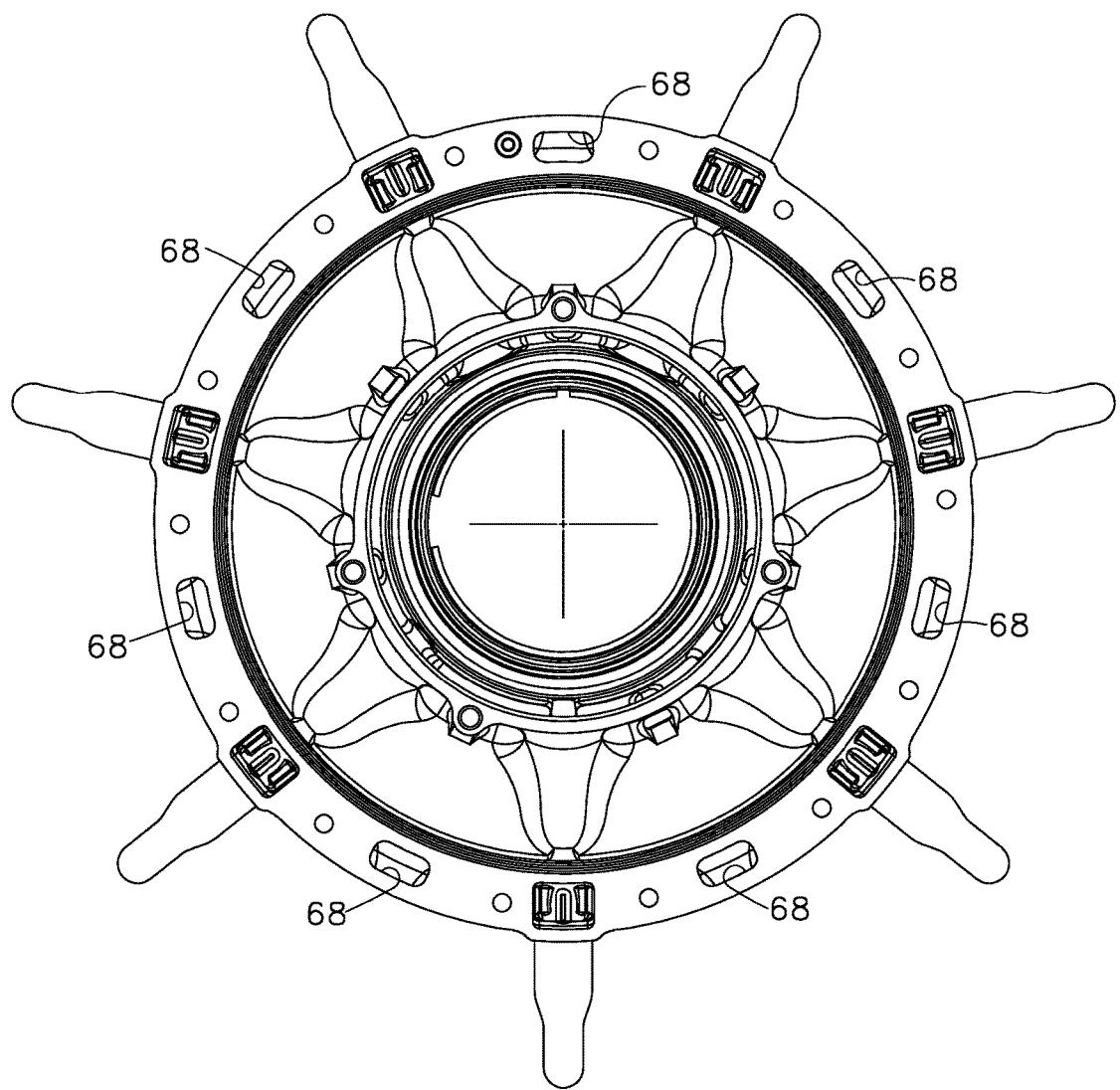
FIG. 4 is a front elevation view of a sump housing.
Figure 5:
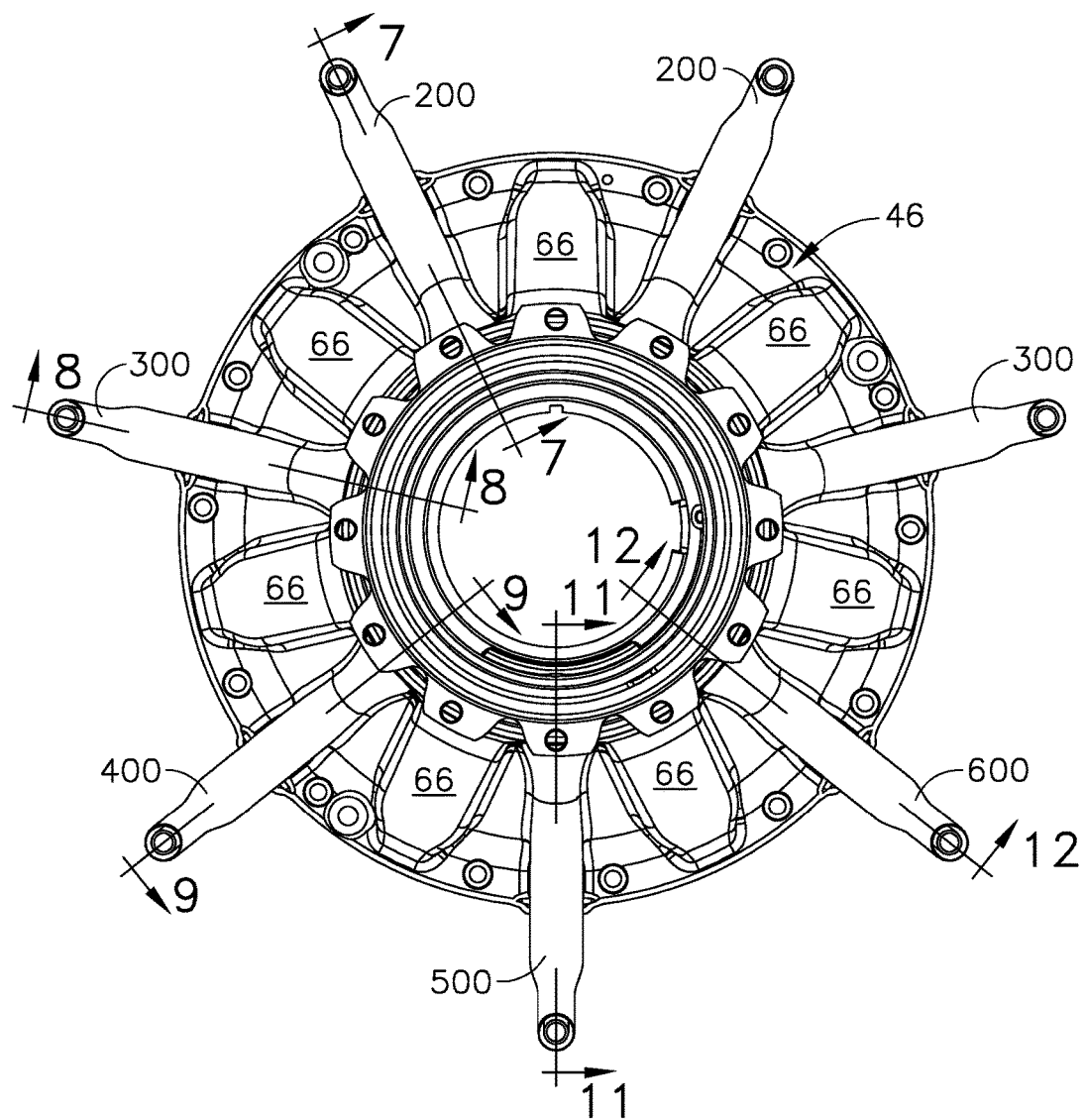
FIG. 5 is a rear elevation view of the sump housing of FIG. 4.
Figure 6:
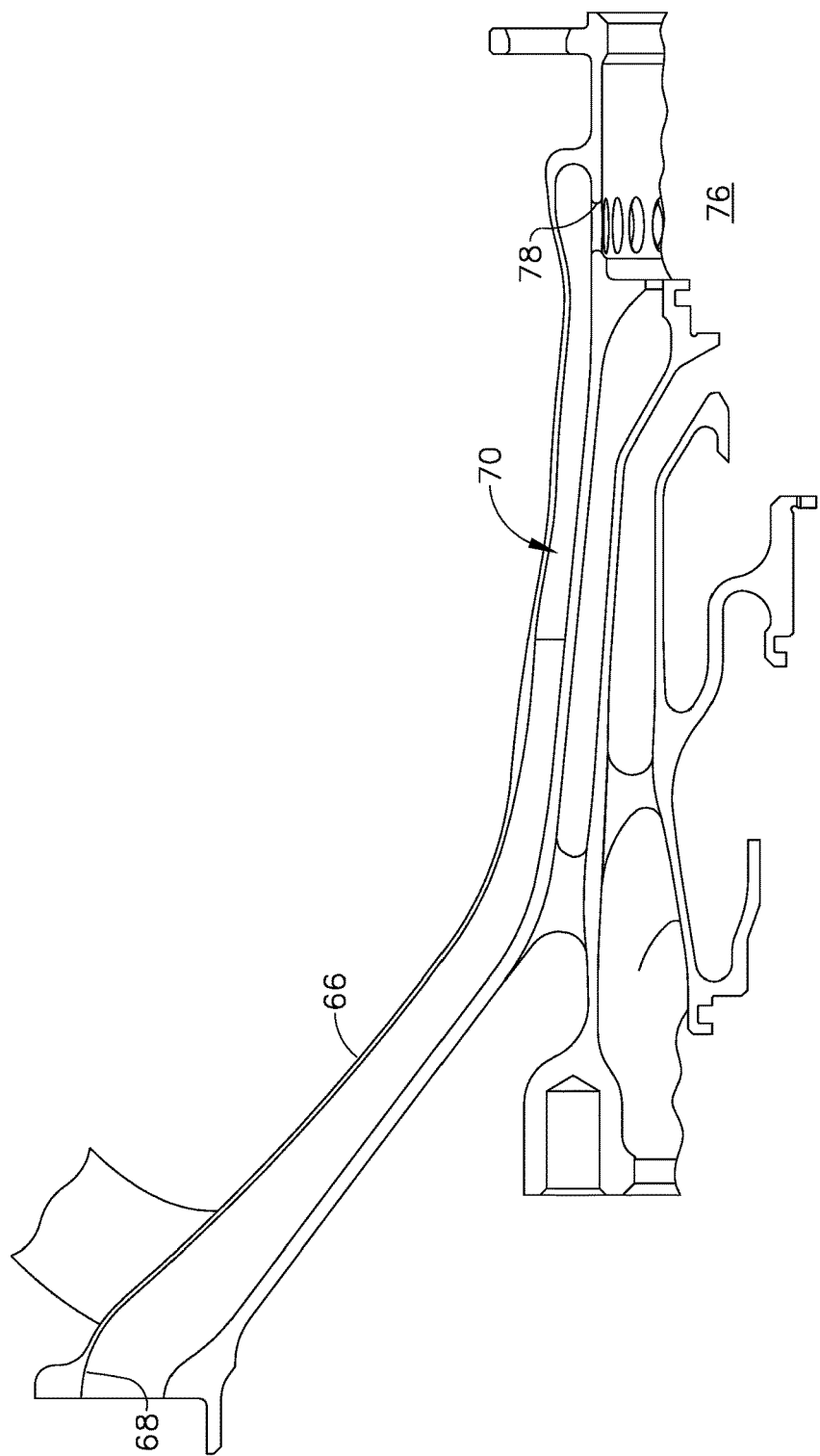
FIG. 6 is a sectional view taken along lines 6-6 of FIG. 5.

As seen in FIGS. 4-6, the sump housing 44 incorporates a plurality of clean air bleed channels 66. These are arrayed around the periphery of the forward section 46, alternating with the service tubes described below. The forward end of each clean air bleed channel 66 has an inlet 68 communicating with the forward mounting flange 50, which in turn communicates with the diffuser 26. The aft end of each clean air bleed channel 66 communicates with a clean air bleed manifold 70 which extends around the periphery of the aft section 48.

Referring to FIG. 3, an annular inducer 72 including a ring of inducer vanes 74 is connected to the aft end of the aft section 48. The two components cooperatively define an inducer cavity 76. The clean air bleed manifold 70 includes a ring of feed holes 78 which communicate with the inducer cavity 76.

An annular forward outer seal 80 is mounted to a forward face of the turbine disk 34 and includes a ring of inlet holes 82. A flowpath is defined from the inlet holes 82, between the forward outer seal 80 and the turbine disk 34, and thence into the turbine blades 20. The inlet holes 82 are aligned with the inducer 72. In operation, compressor discharge air is bled from the diffuser 26, travels through the clean air bleed to channels 66, into the clean air bleed manifold, through the inducer 72, through the inlet holes 82, behind the forward outer seal 80 and finally into the turbine blades 20 where it is used for cooling. The clean air bleed manifold 70, inducer 72, and forward outer seal 80 are merely examples of a cooling air transfer structure that may be used to transport cooling air from the clean air bleed channels 66 to the turbine or other downstream structure.

The sump housing 44 incorporates a radial array of service tubes. These service tubes serve different functional purposes and therefore have different internal flowpaths which will be explained in detail below. It will be understood that the number, position, and function of the service tubes are merely one example configuration. The principles of the present invention may be applied to sump housings having different numbers and types of service tubes.

One common feature of all the service tubes described herein is that their internal flowpath are not governed by their external routing. In observing the service tubes depicted in FIGS. 7-12, it can be seen that all of the service tubes intersect the exterior of the body 45 at the same axial location, while the inner ports of those service tubes intersect the interior of the body 45 at different axial locations and in different configurations.

Figure 7:
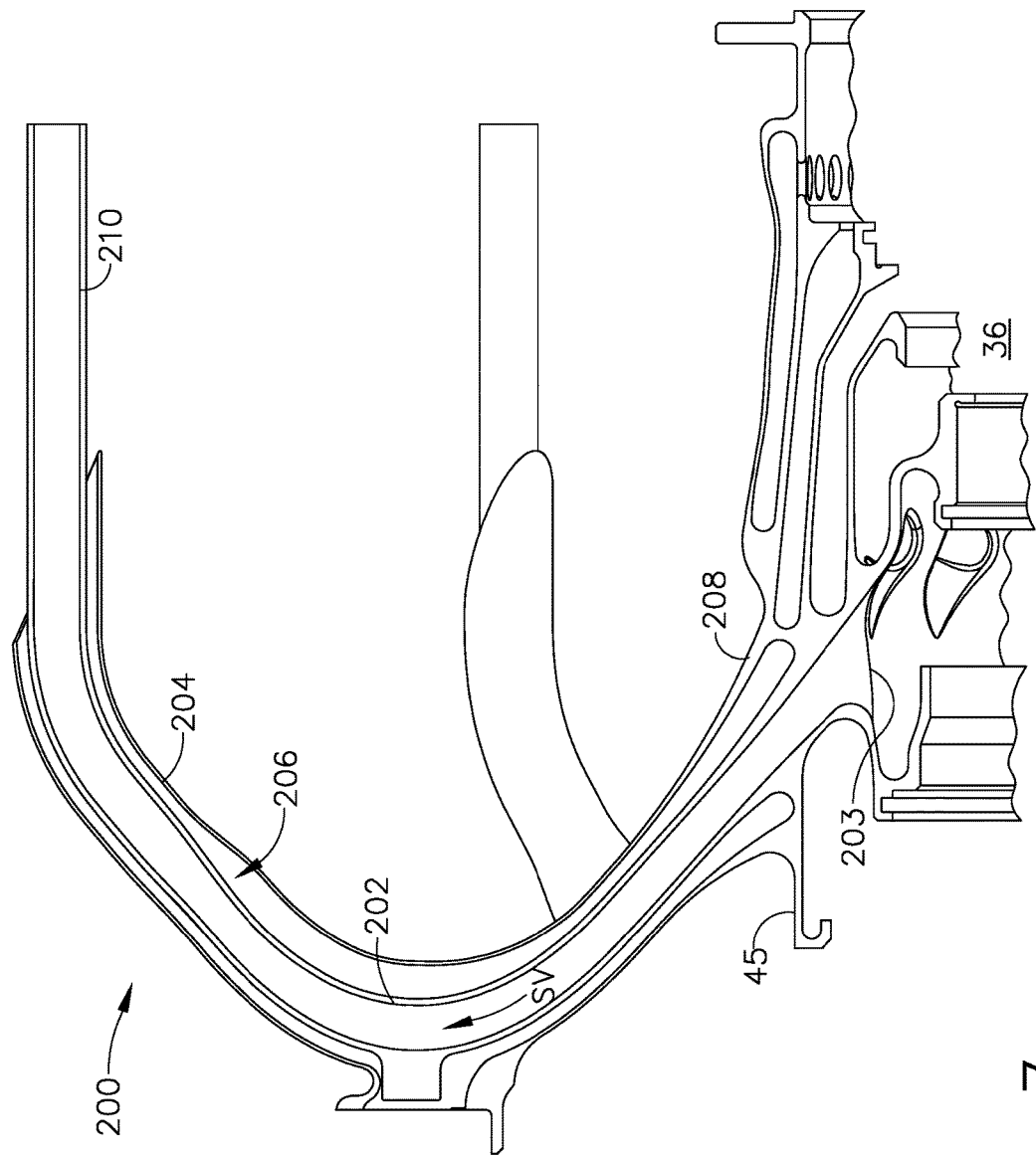
FIG. 7 is a sectional view taken along lines 7-7 of FIG. 5.

In the illustrated example, there are two sump vent tubes denoted 200 located at approximately the 1 o'clock and 11 o'clock positions as seen in FIG. 5. A cross-sectional view of a representative sump vent tube 200 is shown in FIG. 7. The sump vent tube 200 has an inner tube 202 and an outer tube 204 separated by a space 206. A proximal end 208 of the sump vent tube 200 intersects the body 45. An inner port 203 defined by the inner tube 202 communicates with the sump 36 and provides a flowpath for air exiting the sump 36, as shown generally by the arrow labeled "SV". A distal end 210 of the sump vent tube 200 may be coupled to conventional structure for extracting vent air (not shown).

Figure 8:
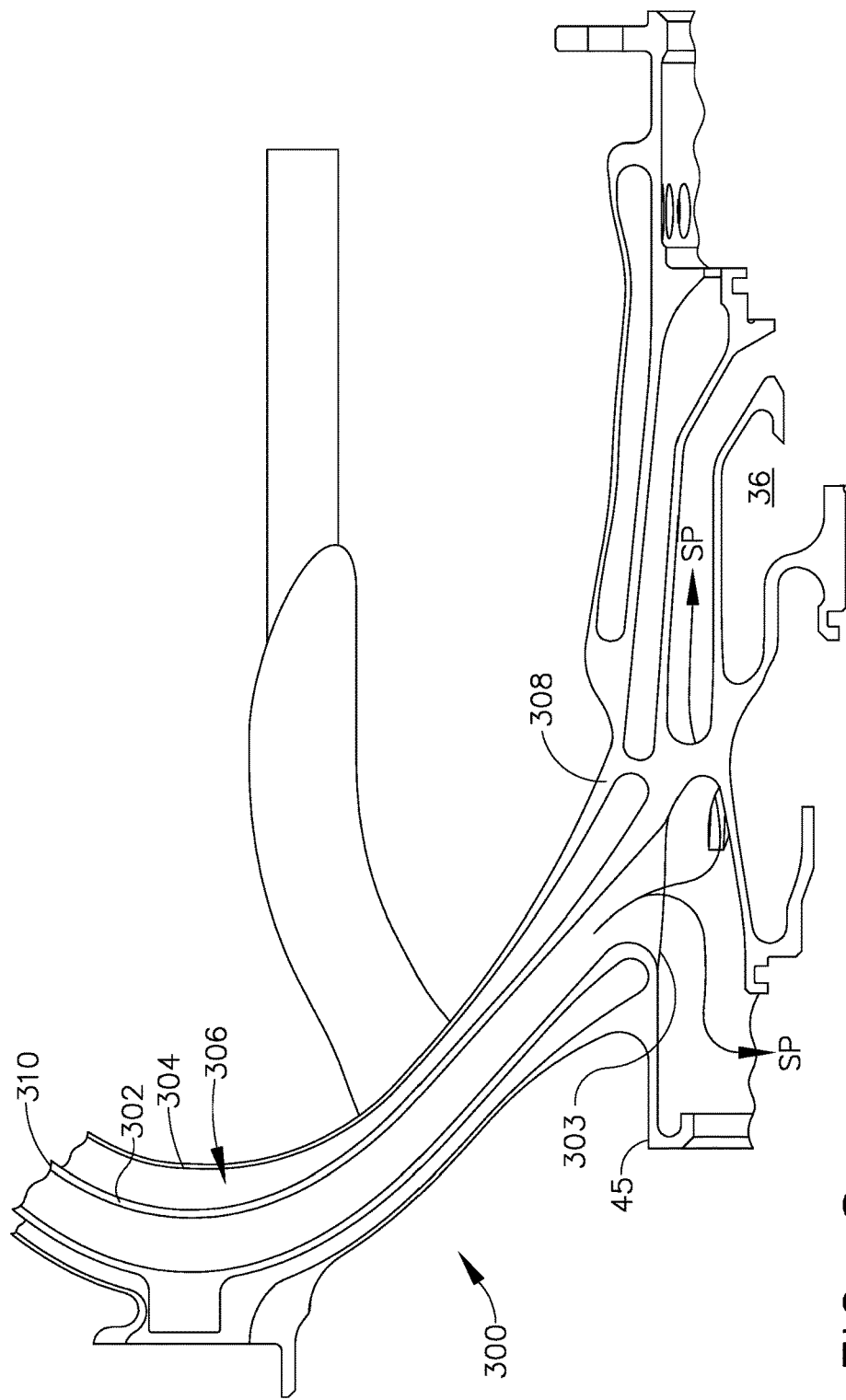
FIG. 8 is a sectional view taken along lines 8-8 of FIG. 5.

In the illustrated example, there are two sump pressurization tubes denoted 300 located at approximately the three o'clock and nine o'clock positions as seen in FIG. 5. A cross-sectional view of a representative sump pressurization tube 300 is shown in FIG. 8. The sump pressurization tube 300 has an inner tube 302 and an outer tube 304 separated by a space 306. A proximal end 308 of the sump pressurization tube 300 intersects the body 45. An inner port 303 defined by the inner tube 302 communicates with the sump 36 and provides a flowpath for air entering the sump 36, as shown generally by the arrow labeled "SP". A distal end 310 of the sump pressurization tube 300 may be coupled to conventional structure for providing pressurized air (not shown).

Figure 9:
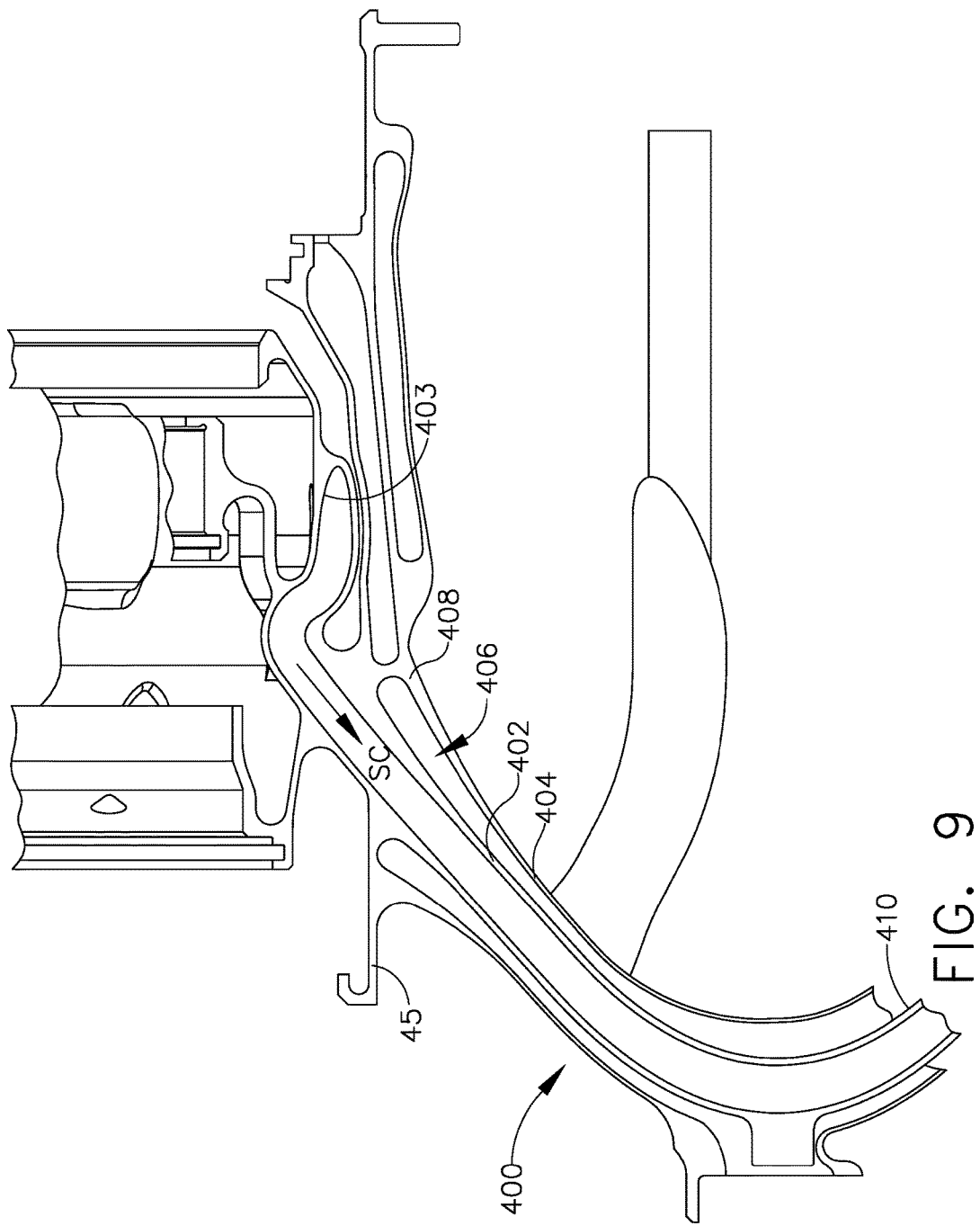
FIG. 9 is a sectional view taken along lines 9-9 of FIG. 5.
Figure 10:
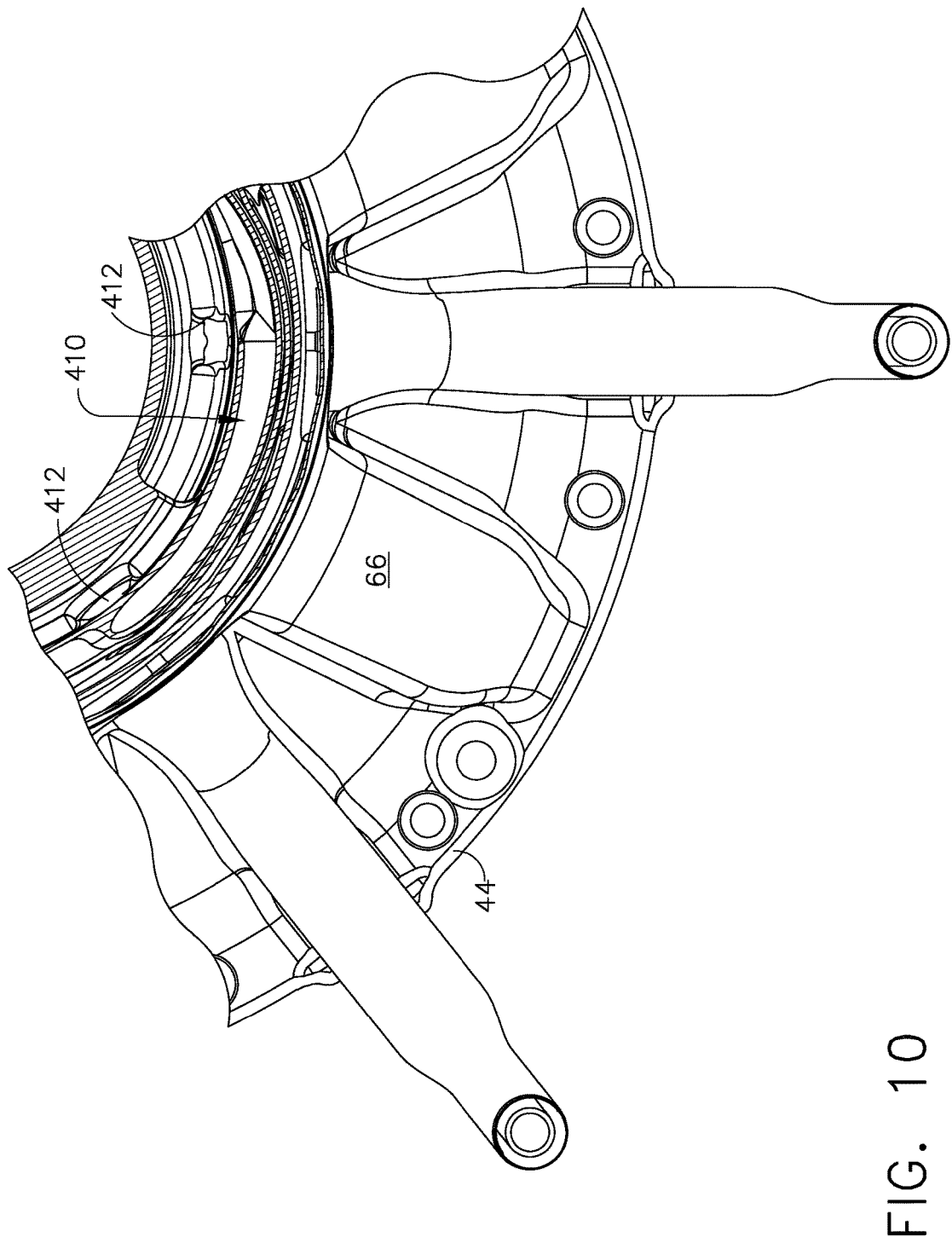
FIG. 10 is a partially-sectioned aft elevation view of the sump housing of referring FIG. 5.

In the illustrated example, there is one oil scavenge tube denoted 400 and located at approximately the seven o'clock position as seen in FIG. 5. A cross-sectional view of a representative oil scavenge tube 400 is shown in FIG. 9. The oil scavenge tube 400 has an inner tube 402 and an outer tube 404 separated by a space 406. A proximal end 408 of the oil scavenge tube 400 intersects the body 45. An inner port 403 defined by the inner tube 402 communicates with the sump 36 and provides a flowpath for oil or an oil/air mixture being scavenged from the sump 36, as shown generally by the arrow labeled "SC". As seen in FIG. 10, the sump housing 44 may incorporate one or more circumferential passages 410 which form part of an internal flowpath between the proximal end 408 of the oil scavenge tube 400 and internal oil passages 412 which are circumferentially offset from the oil scavenge tube 400. A distal end 410 of the oil scavenge tube 400 may be coupled to a conventional structure for providing scavenge flow (not shown).

Figure 11:
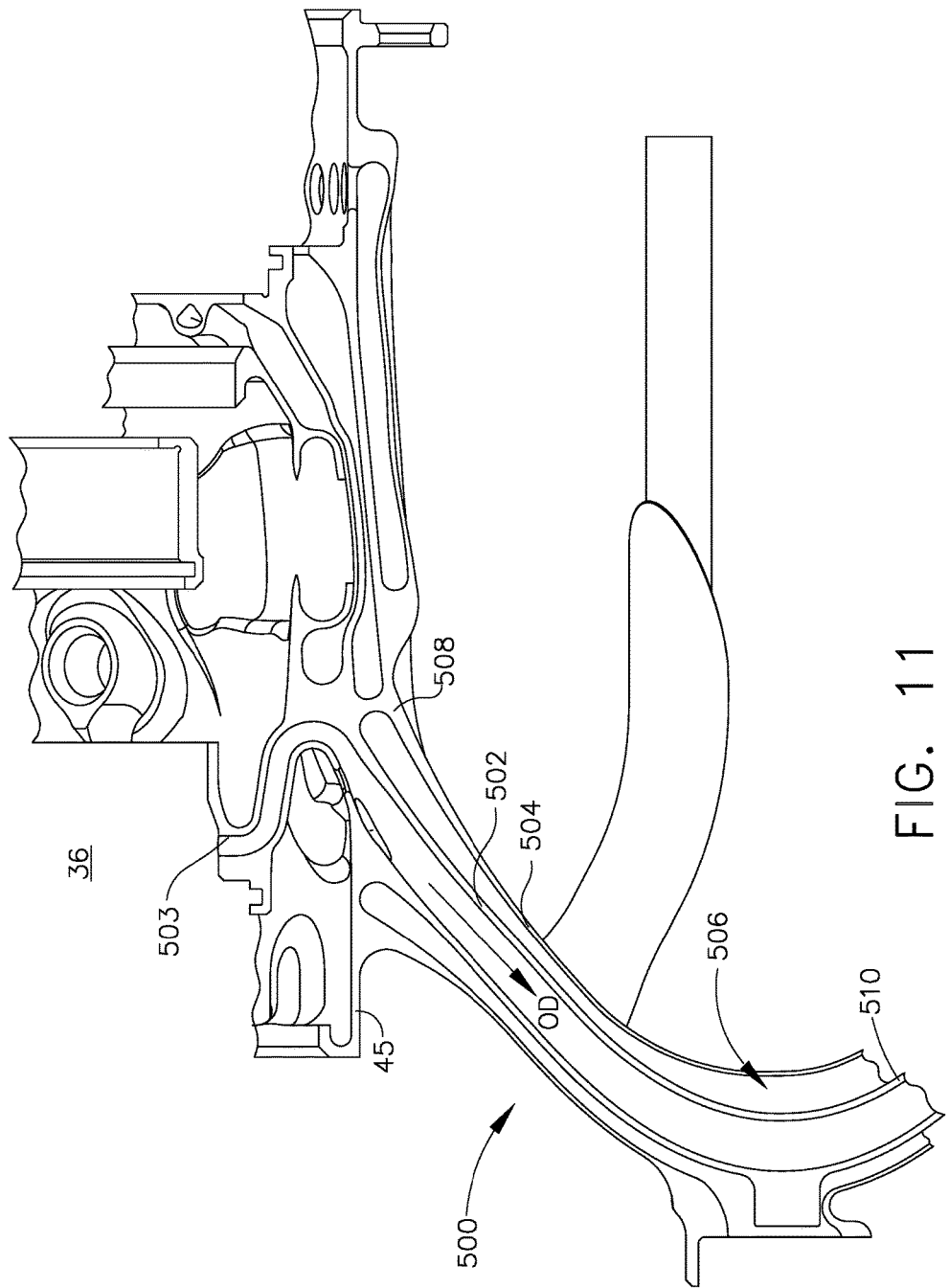
FIG. 11 is a sectional view taken along lines 11-11 of FIG. 5.

In the illustrated example, there is one oil drain tube denoted 500 and located at approximately the six o'clock position as seen in FIG. 5. A cross-sectional view of a representative oil drain tube 500 is shown in FIG. 11. The oil drain tube 500 has an inner tube 502 and an outer tube 504 separated by a space 506. A proximal end 508 of the oil drain tube 500 intersects the body 45. An inner port 503 defined by the inner tube 502 communicates with the sump 36 and provides a flowpath for oil training away from the sump 36, as shown generally by the arrow labeled "OD". A distal end 510 of the oil drain tube 500 may be coupled to a conventional structure for draining oil (not shown).

Figure 12:
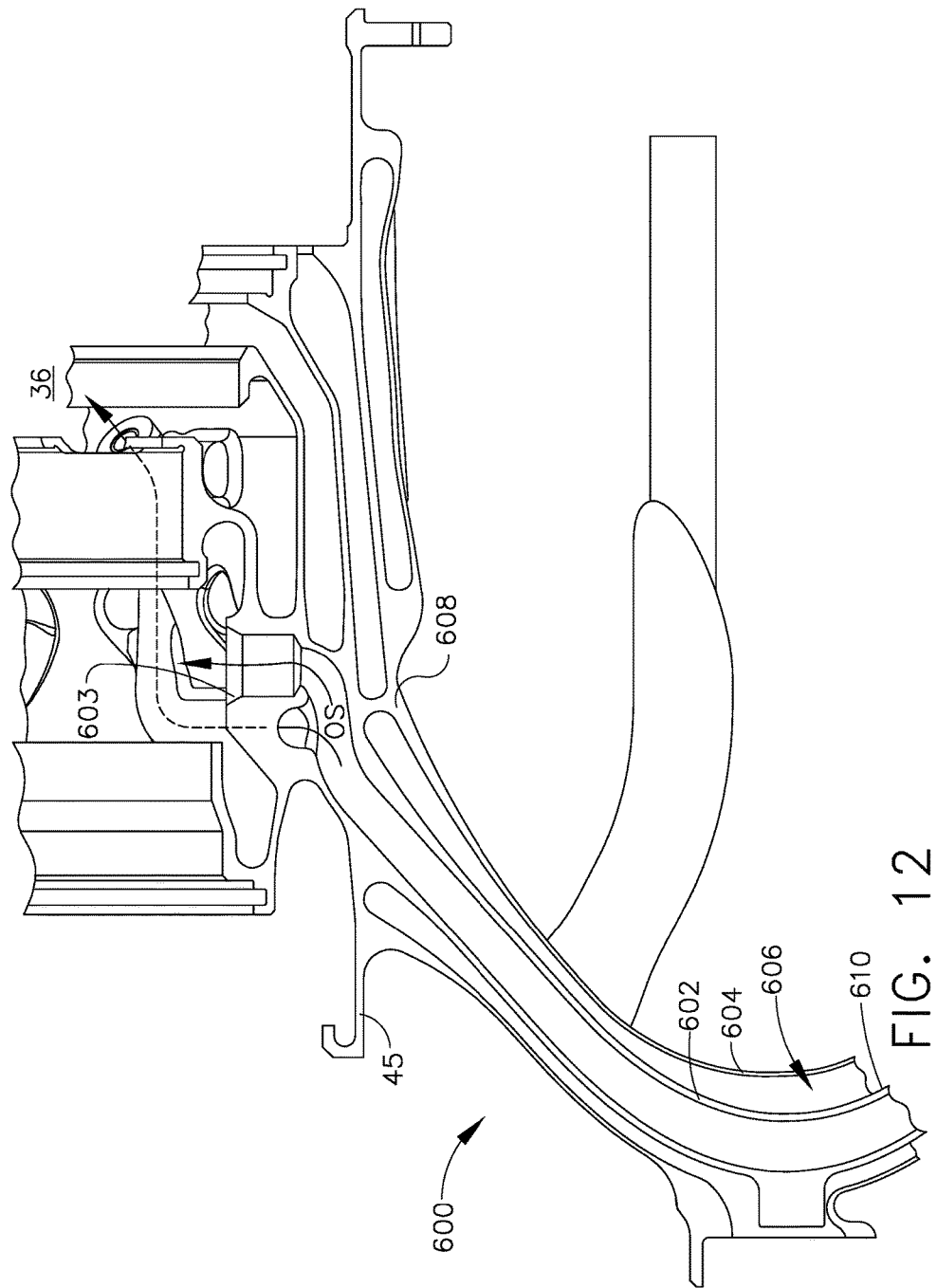
FIG. 12 is a sectional view taken along lines 12-12 of FIG. 5.

In the illustrated example, there is one oil supply tube denoted 600 and located at approximately the four o'clock position as seen in FIG. 5. A cross-sectional view of a representative oil supply tube 600 is shown in FIG. 12. The oil supply tube 600 has an inner tube 602 and an outer tube 604 separated by a space 606. A proximal end 608 of the oil supply tube 600 intersects the body 45. An inner port 603 defined by the inner tube 602 communicates with the sump 36 and provides a flowpath for pressurized oil supply to the sump 36, as shown generally by the arrow labeled "OD". A distal end 610 of the oil supply tube 600 may be coupled to a conventional oil supply structure (not shown).

All or part of the sump housing 10 or portions thereof may be part of a single unitary, one-piece, or monolithic component. Non-limiting examples of methods suitable for constructing the apparatus described herein are contained in U.S. Patent Application Publication 2015/0224743 to Schick et al., which is hereby incorporated by reference.

The sump housing described above has several benefits compared to prior art designs. It will have a lower weight and a robust fatigue life because of the lack of weld joints and the associated stress concentrations. It provides more compact packaging of more features than prior art designs which are built up from multiple components. It also incorporates a bleed air cooling circuit not found in prior art designs.

The foregoing has described a sump housing for a gas turbine engine. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A sump housing apparatus for a gas turbine engine, comprising:
   an annular body; and
   a plurality of service tubes arrayed around the annular body, each service tube having a proximal end intersecting the annular body and an opposed distal end, each service tube having an inner port communicating with an interior of the annular body, wherein the proximal ends of two or more of the service tubes intersect the annular body at a common axial location, and respective inner ports of the two or more service tubes communicate with the interior at different axial locations;
   wherein the annular body and at least one of the service tubes are part of a monolithic whole.

2. The sump housing apparatus of claim 1 further including an annular bearing support arm extending from the annular body.

3. The sump housing apparatus of claim 1 further including at least one annular seal support arm extending from the annular body.

4. The sump housing apparatus of claim 1 wherein the annular body defines at least one clean air bleed channel extending from a forward mounting flange of the annular body to an annular clean air bleed manifold of the annular body.

5. The sump housing apparatus of claim 1 wherein at least one of the service tubes has an inner port circumferentially displaced from the proximal end of the at least one service tube.

6. The sump housing apparatus of claim 1 wherein the annular body includes a conical forward section joined to a cylindrical aft section.

7. The sump housing apparatus of claim 6 wherein the proximal end of the each service tube intersects the conical forward section.

8. The sump housing apparatus of claim 1 wherein each service tube comprises an inner tube and an outer tube separated by space.

9. The sump housing apparatus of claim 8 wherein the inner tube of each service tube defines the inner port of that service tube.

10. A turbine engine apparatus comprising:
    a compressor, a combustor, and a turbine disposed in serial flow relationship;
    a shaft interconnecting the compressor and the turbine;
    a sump located axially between the compressor and the turbine, and radially between the combustor and the shaft; and
    a sump housing defining in part an outer boundary of the sump, and comprising:
    an annular body; and
    a plurality of service tubes arrayed around the annular body, each service tube having a proximal end intersecting the annular body and an opposed distal end, each service tube having an inner port communicating with the sump, wherein the proximal ends of two or more of the service tubes intersect the annular body at a common axial location, and respective inner ports of the two or more service tubes intersect the annular body at different axial locations;
    wherein the annular body and at least one of the service tubes are part of a monolithic whole.

11. The turbine engine apparatus of claim 10 wherein the sump housing defines a clean air bleed flow path passing from the compressor to the turbine through the annular body.

12. The apparatus of claim 11 wherein the annular body defines at least one clean air bleed channel extending from a forward mounting flange of the annular body to an annular clean air bleed manifold of the annular body.

13. The turbine engine apparatus of claim 12 further comprising a cooling air transfer structure disposed in fluid communication with the clean air bleed manifold and the turbine.

14. The turbine engine apparatus of claim 10 further including:
 an annular bearing support arm extending from the annular body; and
 a bearing disposed between the bearing support arm and the shaft.

15. The turbine engine apparatus of claim 10 further including at least one annular seal support arm extending from the annular body.

16. The turbine engine apparatus of claim 10 wherein at least one of the service tubes has an inner port circumferentially displaced from the proximal end of the at least one service tube.

17. The turbine engine apparatus of claim 10 wherein the annular body includes a conical forward section joined to a cylindrical aft section.

18. The apparatus of claim 17 wherein the proximal end of each of the service tubes intersects the conical forward section.

19. The turbine engine apparatus of claim 10 wherein each service tube comprises an inner tube and an outer tube separated by space.

20. The turbine engine apparatus of claim 19 wherein the inner tube of each service tube defines the inner port of that service tube.

* * * * *